(12) United States Patent
Snyder et al.

(10) Patent No.: US 11,866,948 B2
(45) Date of Patent: *Jan. 9, 2024

(54) OFFSET MOUNTING ADAPTER FOR CONCRETE SURFACE PROCESSING TOOL

(71) Applicant: Wagman Metal Products Inc., York, PA (US)

(72) Inventors: Jeffrey L Snyder, York, PA (US); George F. Wagman, III, York, PA (US)

(73) Assignee: Wagman Metal Products Inc., York, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/697,421

(22) Filed: Mar. 17, 2022

(65) Prior Publication Data

US 2022/0220752 A1 Jul. 14, 2022

Related U.S. Application Data

(63) Continuation of application No. 16/408,904, filed on May 10, 2019, now Pat. No. 11,286,677, which is a continuation of application No. 15/245,316, filed on Aug. 24, 2016, now Pat. No. 10,370,863.

(51) Int. Cl.
*E04F 21/00* (2006.01)
*E04F 21/24* (2006.01)
*B23F 11/00* (2006.01)
*B24D 18/00* (2006.01)

(52) U.S. Cl.
CPC ............ *E04F 21/247* (2013.01); *B23F 11/00* (2013.01); *B24D 18/009* (2013.01)

(58) Field of Classification Search
CPC ......... B24D 18/09; B23P 11/00; E04F 21/247
USPC ....................................................... 404/112
See application file for complete search history.

(56) References Cited

U.S. PATENT DOCUMENTS

| 1,748,548 A | 2/1930 | Gillis |
| 2,434,408 A | 1/1948 | Huffman |
| 2,605,683 A | 8/1952 | Boulton |
| 4,215,495 A | 8/1980 | Wagner |
| 4,232,980 A | 11/1980 | Tertinek et al. |
| 4,784,519 A | 11/1988 | Artzberger |
| 5,238,323 A | 8/1993 | Allen et al. |
| 5,372,452 A | 12/1994 | Hodgson |
| 5,993,109 A | 11/1999 | Motl et al. |
| 6,264,397 B1 | 7/2001 | Majewski |

(Continued)

*Primary Examiner* — Raymond W Addie
(74) *Attorney, Agent, or Firm* — Buchanan Ingersoll & Rooney PC

(57) ABSTRACT

A mounting adapter for mounting a surface processing tool having a rotational or longitudinal axis to at least one spider arm of a rotatable spider assembly of a surface processing apparatus, the spider arm having a leading side and a trailing side as a function of the direction of rotation of the spider assembly. The mounting adapter has a first element for removably attaching the adapter to the spider arm and a second element positioned circumferentially offset behind the first element for positioning the rotational or longitudinal axis of a surface processing tool circumferentially offset behind the trailing side of the spider arm. The first element is an elongate apertured bar and the second element is weld filler material, the bar being connected to said surface processing tool via the weld filler material.

18 Claims, 14 Drawing Sheets

(56) References Cited

U.S. PATENT DOCUMENTS

| | | |
|---|---|---|
| 6,368,016 B1 | 4/2002 | Smith et al. |
| 7,059,801 B2 | 6/2006 | Snyder et al. |
| 7,771,139 B2 | 8/2010 | Grahl |
| 7,815,393 B2 | 10/2010 | Snyder et al. |
| 2006/0025059 A1 | 2/2006 | Gueorguiev et al. |
| 2009/0028643 A1* | 1/2009 | Snyder .................. E04F 21/248 |
| | | 404/112 |
| 2021/0355694 A1 | 11/2021 | Snyder et al. |

\* cited by examiner

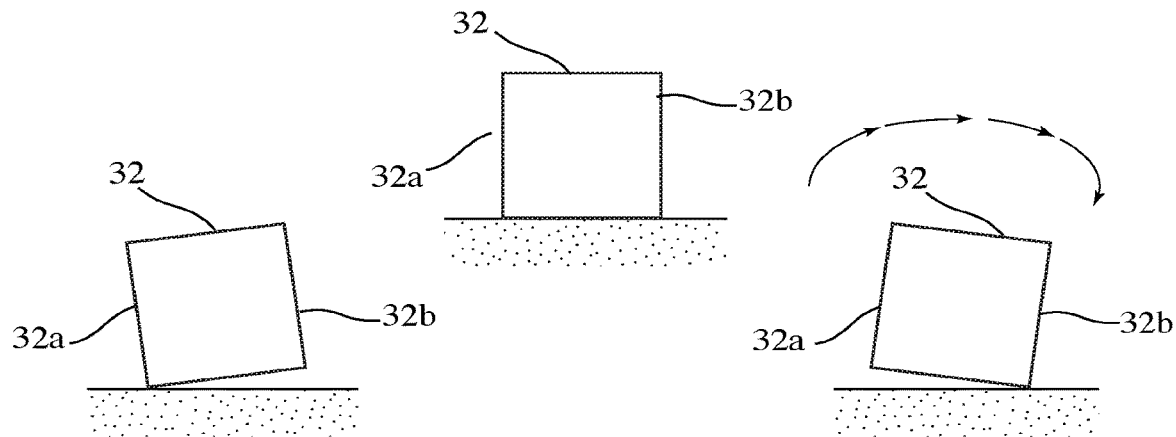
FIG. 4A
Prior Art
FIG. 4B
Prior Art
FIG. 4C
Prior Art
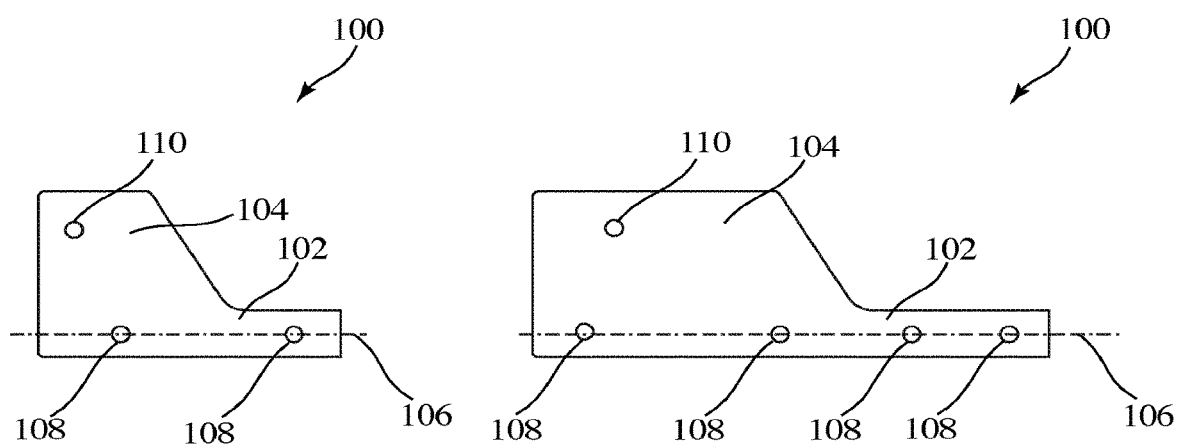
FIG. 5A
FIG. 5B

OFFSET MOUNTING ADAPTER FOR CONCRETE SURFACE PROCESSING TOOL

FIELD OF THE INVENTION

The present invention relates to surface processing machines for mounting surface processing tools and, more particularly, to a method and adapter for mounting surface processing tools, rotatable and otherwise, on the arms of motor driven spider arm assemblies of such machines.

BACKGROUND OF THE INVENTION

It is known that during the installation of concrete floors, the troweling and finishing operation is performed on the wet concrete using either walk-behind or ride-on power trowels. Inasmuch as at least one type of power trowel machine is generally already on site during the installation of concrete floors, the present invention seeks to use the on-site availability of these machines for surface finishing purposes. As used herein, the term "surface finishing" refers to the desired surface texture on a concrete slab after troweling and final setting of the concrete. In addition, generally, concrete contractors do not have specialty surface processing machines on site for surface finishing and typically do not own such machines. Therefore, where specialty surface processing machines are used to surface finish concrete surfaces, concrete contractors have to invest in and own or lease separate, expensive pieces of equipment. As used herein, the terms "surface processing machines" and "surface processing tools" refers to machines and tools used for surface finishing a concrete slab.

In one of its forms, the present invention takes advantage of the larger finished area attainable with ride-on power trowel machines by converting these power trowel machines to surface processing machines suitable for tasks other than troweling. Ride-on power trowel machines typically range in size from approximately 6 feet to slightly more than 10 feet in width and produce a troweled area of up to 40 square feet. The largest units weigh more than a ton and can finish about 30,000 square feet per day. Ride on trowels, such as the trowel machine illustrated in FIG. 1, can be configured with two or more spider assemblies, each having a plurality of radially oriented, spaced-apart arms and a trowel blade mounted on and below each arm. The blades on adjacent rotors may be overlapping or non-overlapping. A typical four arm spider assembly suitable for use with either a ride-on or walk-behind power trowel is illustrated in FIG. 2. The assembly generally includes four radially extending arms emanating from a central hub, which receives a drive shaft. A trowel blade is mounted directly via bolts or indirectly via a mounting bar on and below each of the arms. Concrete troweling machines having spider assemblies for mounting trowel blades, and the manner of attachment of the trowel blades to the spider arms, are discussed in detail in U.S. Pat. No. 7,059,801—Snyder et al, the disclosure of which is incorporated herein by reference.

Converting walk-behind or ride-on trowel machines to general purpose surface processing machines involves providing mounting means which allows the rapid, on-site substitution of surface processing tools, such as circular brushes, on the spider arms in place of the trowel blades which were used during the installation of the concrete floor. Such mounting means have the advantage that they can mount surface processing tools, instead of blades, such as scrubbing, brushing, buffing, grinding and polishing tools, on the spider arms using readily available hand tools in a very short period of time without need for heavy or expensive equipment. Exemplary currently available mounting means which can accomplish the rapid mounting of rotatable surface processing tools on troweling machines are disclosed in U.S. Pat. No. 7,815,393-Snyder et al, the disclosure of which is incorporated herein by reference. Rotatable surface finishing tools are mounted to each of the spider arms, frequently using a mounting bar, with their rotational axes in vertical registry with and directly beneath the spider arm, such that as the spider arms rotate about the hub, the rotatable surface processing tools, e g., circular brushes, on each arm are intended to be free to spin about a mounting axis perpendicular to the spider arms and parallel to the axis of rotation of the spider arms. Likewise, non-rotatable finishing tools, e g., grinding stone holders, are conventionally mounted with their longitudinal axis in vertical registry with and directly beneath the spider arm.

During troweling operations on wet concrete surfaces, the surface is finished or smoothed in steps, starting with a rough finish and stepwise moving toward a so-called burnished finish. In the initial steps the spider arms and, thus, the attached trowel blades, are pivoted or pitched by the operator just a few degrees to slightly raise the leading edge of the blade off the concrete surface in order to avoid its inadvertent digging in to the concrete surface while the weight of the troweling machine maintains the trailing edge of the blade in contact with the concrete. The angle $\theta$ formed between the blade 36 and the concrete, as shown in FIG. 3, is referred to as the pitch of the blade. As surface finishing of the wet concrete progresses, the pitch of the blade is increased gradually from slightly above zero pitch to the maximum pitch of the blades, typically about $\theta=25°$-$30°$ in FIG. 3, on successive passes to put increasingly greater pressure on the concrete surface. The terms "leading edge" and "trailing edge" refer to the edges of the trowel blade as a function of the direction of rotation of the spider assembly, i.e., clockwise or counter-clockwise. Correspondingly, the terms "leading side" and "trailing side" refer to the sides of each of the arms 32 of the spider assembly as a function of the direction of rotation of the spider assembly, i.e., clockwise or counter-clockwise.

FIG. 4A, FIG. 4B, and FIG. 4C illustrate an end view of a spider arm 32 when the spider assembly is rotating in a clockwise direction. In this and other figures the arcuate arrow indicates the direction of rotation, i.e. clockwise or counterclockwise, of the spider arm and assembly. Spider arms are typically polygonal in cross section, e.g., square, rectangular, hexagonal, octagonal, etc. FIG. 4B shows the spider arm 32 in a horizontal or unpivoted position. FIG. 4A illustrates a spider arm 32 pivoted into a leading side 32a down position while FIG. 4C shows a spider arm 32 pivoted into a trailing side 32b down position. Without a blade attached to each spider arm 32, but with a surface processing tool attached directly under the spider arm, the spider arms of many conventional troweling machines tend to pivot, more or less, toward a trailing side 32b inclined down position as shown in FIG. 4C. If one compares the pivoted trailing side 32b inclined down position of the spider arm in FIG. 4C with the unpivoted position of the spider arm in FIG. 4B it will be appreciated that the trailing side 32b pivoted down position is the same as the pitched trowel blade trailing edge down position desirable during wet concrete finishing operations using trowel blades. This tendency to pivot to a trailing side down position presents a problem when trowel blades are removed from the spider arms and surface processing tools, such as brushes, grinding stones, grinding pads or other honing or polishing pads are installed on the spider arms. The problem is particularly, but not exclusively, noted when the surface processing tool is a rotating tool and a bearing is mounted between the spider arm and the tool in an effort to allow the tool to freely spin as the spider arm is circularly driven by the trowel assembly motor. This is because a rotating tool bearing is designed to have enough play to allow it to absorb forces encountered during use, such as a brush striking bumps on the floor or impacting with walls, and this play allows the bearing to pivot severely due to the trailing side down pivoting of the spider arm. The result is that the bearing tends to bind and is unable to freely rotate, causing it to wear more rapidly than it would in normal use. At the same time, the attached surface processing tool is unable to freely rotate, is not oriented flat on the concrete surface and is caused, by the spider arm pivoting, to wear unevenly, which shortens the tool's useful life. Similar uneven wear is noted when the surface processing tool is non-rotatable, such as a grinding stone surface processing tool housed within a grinding stone holder, when the holder is mounted on and directly beneath the spider arms.

BRIEF DESCRIPTION OF THE DRAWINGS

FIG. 4A is a side elevation view of the free end of a spider arm in its leading side down position, FIG. 4B shows it in its unpivoted position and FIG. 4C shows it in its trailing side down position, when the spider assembly is rotated in a clockwise direction.

FIG. 5A and FIG. 5B are a top plan view of two embodiments, FIG. 5A and FIG. 5B, of an offset mounting plate of the present invention.

SUMMARY OF THE INVENTION

Figure 1:
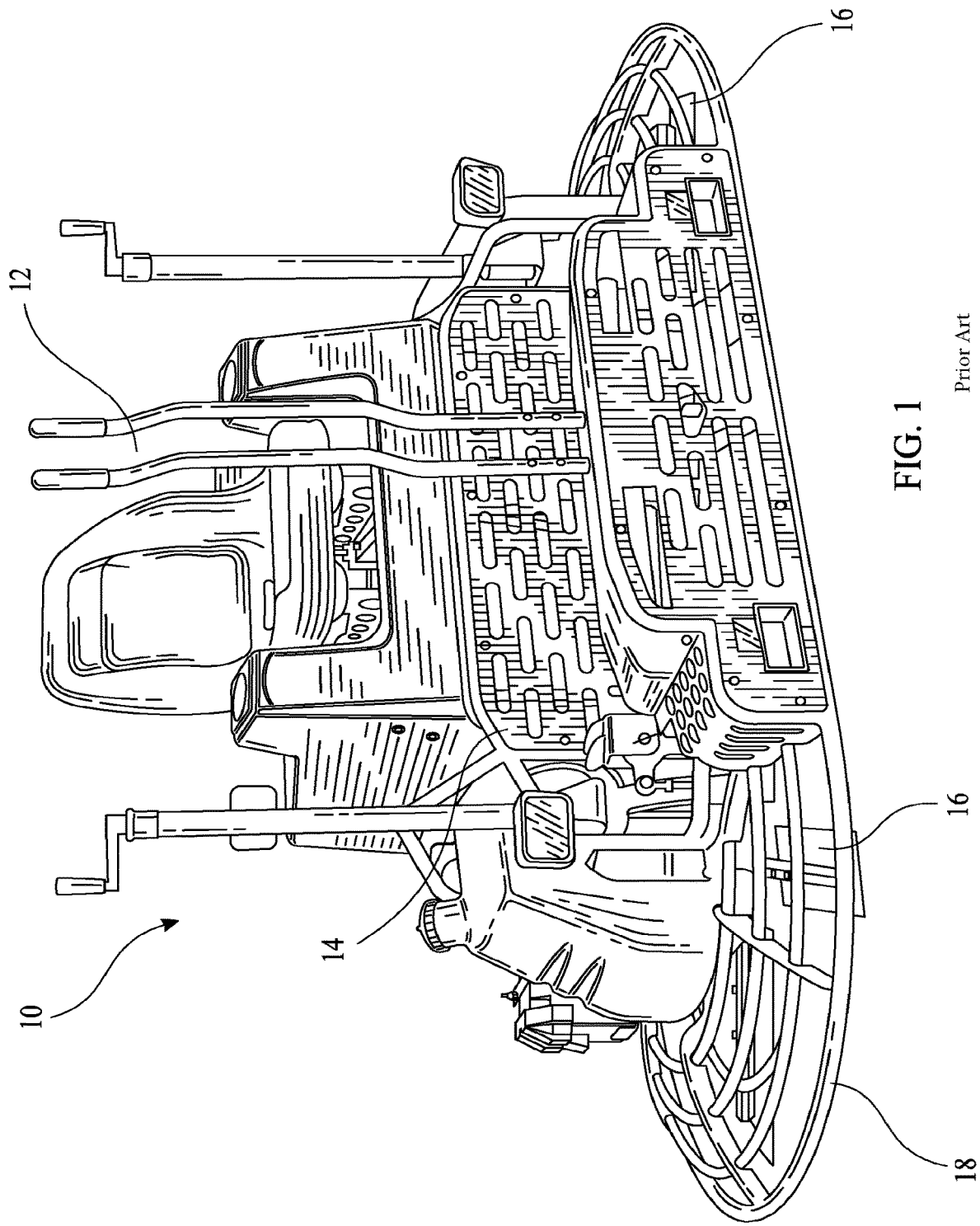
FIG. 1 is a perspective view of a ride-on power trowel.

It is, therefore, a primary object of the present invention to provide a mounting adapter for mounting the rotational or longitudinal axis of a surface processing tool circumferentially behind the trailing side of a spider arm.

It is another object of the present invention to provide such a mounting adapter for surface processing tools which allows their use on conventional power trowel machines having spider assembly arms.

It is still another object of the present invention to provide such a mounting adapter which, when mounted between a surface processing tool and a spider arm, overcomes the tendency of the spider arms to pivot toward a trailing side down position and allows the tool to function without uneven wear.

It is yet another object of the present invention to provide such a mounting adapter which allows advantage to be taken of the presence at a concrete floor construction site of readily available high square footage capacity power trowel machines for surface processing purposes.

It is another object of the present invention to provide such a mounting adapter which allows the rapid, on-site substitution of surface processing tools on spider arms in place of the trowel blades used during concrete floor installation.

It is still another object of the present invention to provide such a mounting adapter for surface processing tools on spider assemblies which allows rotatable surface processing tools to spin freely about their axes while the spider arms are rotatably driven in order to encourage more uniform wear of the tools and a longer useful life.

The foregoing and other objects are achieved in accordance with the present invention by providing a mounting adapter for mounting a surface processing tool having a rotational or longitudinal axis to at least one spider arm of a motor driven rotatable spider assembly of a surface processing apparatus, said spider arm having a top surface and a bottom surface, and a leading side and a trailing side as a function of the direction of rotation of said spider assembly, said mounting adapter comprising: a first element for removably attaching said adapter to said spider arm and, a second element unitary with or connected to said first element and positioned circumferentially offset behind said first element, said second element comprising means for positioning the rotational axis of rotating surface processing tools or the longitudinal axis of non-rotatable surface processing tools circumferentially offset behind said trailing side of said spider arm.

In accordance with another aspect of the invention, the present invention provides a method for mounting a surface processing tool having a rotational or longitudinal axis to at least one spider arm of a motor driven rotatable spider assembly of a surface processing apparatus, said spider arm having a top surface and a bottom surface, and a leading side and a trailing side as a function of the direction of rotation of said spider assembly, said method comprising:
removably attaching a mounting adapter to said spider arm,
said mounting adapter comprising a first element for attachment to said spider arm and a second element unitary with or connected to said first element and positioned circumferentially offset behind said first element; and attaching said surface processing tool to means on said second element for positioning the rotational axis of rotating surface processing tools or the longitudinal axis of non-rotatable surface processing tools circumferentially offset behind said trailing side of said spider arm.

In accordance with still another aspect of the invention, said first element comprises an elongate handle and said second element comprises a planar plate, wider than said handle, and extending generally perpendicularly from said handle between one end of said handle and a point intermediate the ends of said handle, said planar plate comprising means for positioning the rotational axis of rotating surface processing tools or the longitudinal axis of non-rotatable surface processing tools circumferentially offset behind said trailing side of said spider arm.

In accordance with yet another aspect of the invention, said first element comprises an elongate apertured bar and said second element comprises weld filler material, said bar being connected to said surface processing tool via said weld filler material.

In accordance with a further aspect of the invention, said first element comprises an elongate apertured bar and said second element comprises a tool support bar or plate extending generally perpendicularly from said bar between its ends and rigidly attached thereto.

DETAILED DESCRIPTION OF THE INVENTION

Figure 2:
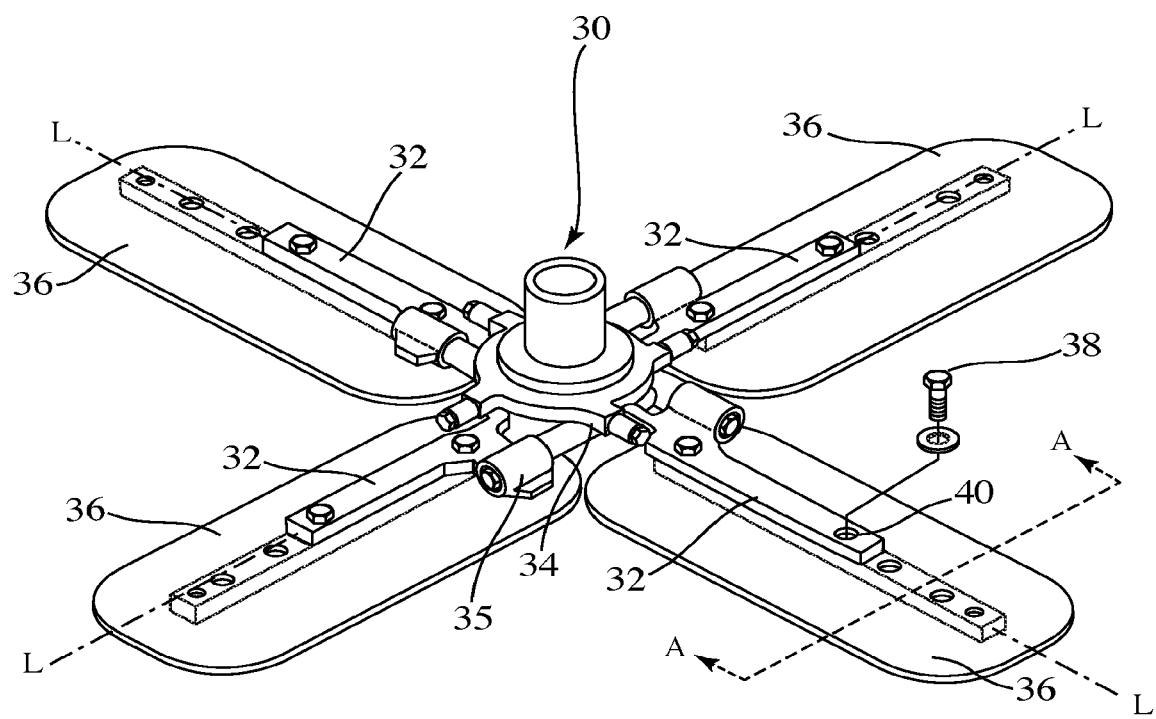
FIG. 2 is a top perspective view of a four spider arm spider assembly mounting four trowel blades and suitable for use with ride-on surface processing machines.
Figure 3:
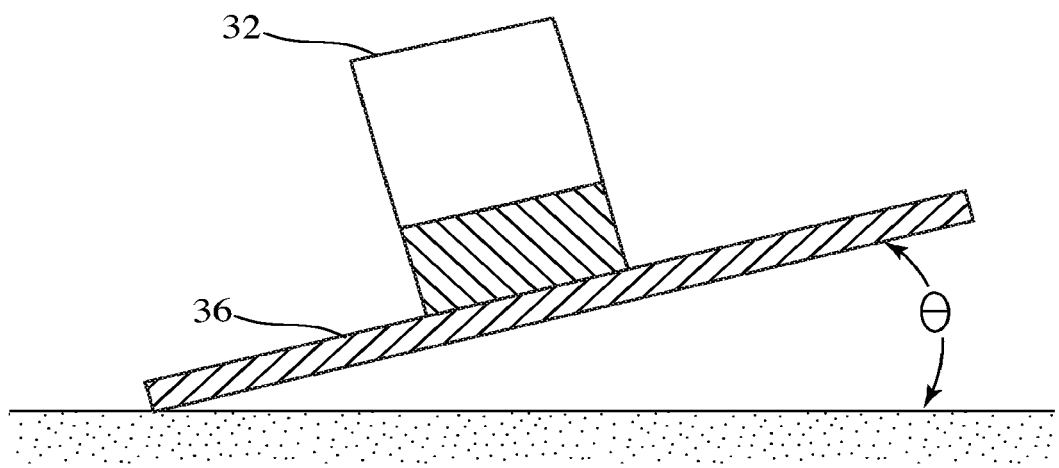
FIG. 3 is a sectional view taken along line A-A in FIG. 2 showing the pitch of a trowel blade during a finishing operation.

Referring to FIG. 1 there is shown a conventional ride-on concrete finishing power trowel 10 comprising an operator seating and control station 12, an engine 14, at least two downwardly projecting spider assemblies 16, each assembly having a plurality of radially extending, circumferentially spaced-apart spider arms and a trowel blade mounted on each arm for providing at least two sets of horizontal rotating blades encircled by a guard ring cage 18. The adjacent spider assemblies 16 counterrotate, with one rotating clockwise and the other rotating counterclockwise. A typical four arm spider assembly 30, suitable for use with either a ride-on or walk-behind power trowel, is illustrated in FIG. 2. The assembly includes four radially extending arms 32 emanating from a central hub 34, which receives a drive shaft (not shown). Each spider arm 32 includes a pivot assembly 35 which allows the arm 32 to pivot about its longitudinal axis L. A trowel blade 36 is mounted via threaded bolts 38 (and lock washers and hex nuts, if desired) below each spider arm 32 in threaded apertures 40 spaced along and extending through each spider arm 32. It will be appreciated that each rotor assembly may contain more or less than four arms for mounting trowel blades thereon, the number of arms being a matter of design choice.

The present invention provides a solution to the problem of surface processing tools wearing unevenly and to the problem of spider arm tendency to pivot which prevents free and unimpeded rotation of rotatable surface processing tools. According to the present invention these problems are overcome by providing a mounting adapter for mounting the rotational or longitudinal axis of the surface processing tool circumferentially behind the trailing side of the spider arm. It has been found that offsetting the surface processing tool circumferentially behind the trailing side of a spider arm controls the tendency of the spider arm to pitch into a trailing side down position. It will be appreciated, of course, that the side of a spider arm which is the trailing side is a function of the direction of rotation, clockwise or counter-clockwise, of the spider assembly. It follows that the trailing side when the rotation is clockwise becomes the leading side if the rotation is counter-clockwise. The mounting adapter of the present invention comprises a first means for attaching the adapter to the spider arm, desirably to the top or bottom surface of the spider arm, and a second means for positioning the rotational or longitudinal axis of the surface processing tool circumferentially behind the trailing side of the spider arm. Desirably the first and second means comprising the adapter are unitary and planar but, alternatively, may be separate structures rigidly attached via well known connecting means, such as welds, bolts, and the like.

It will also be appreciated that although the mounting adapter of the present invention will be described herein with reference to ride-on surface processing machines due to the unique advantage they offer in terms of square feet of concrete which can be finished per day, the mounting adapter can, of course, be used with walk-behind surface processing machines which also conventionally use downwardly projecting rotor or spider assemblies for mounting trowel blades. In addition, although the present invention will be described herein primarily with reference to circular brushes as illustrative of rotatable surface processing tools and grinding stone holders as illustrative of non-rotatable surface processing tools, it will be appreciated that the mounting adapter of the present invention can, of course, be used with other surface processing tools, such as scrubbers, buffers, grinders, polishers, and the like.

Referring to FIG. 5A and FIG. 5B there are illustrated two preferred embodiments, in the form of offset mounting plates 100, of an offset mounting adapter of the present invention. Fundamentally, they differ only in size to accommodate the differing lengths of spider arms in spider assemblies. In one form, each offset mounting plate 100 has the general shape of a cleaver including an elongate handle 102 which merges into a wider offset blade portion 104, which blade portion 104 extends in width in a direction generally perpendicular to the longitudinal axis 106 of the handle 102. Handle 102 includes apertures 108 for attachment of the handle 102 to the spider arm 32, desirably using at least two bolts, which extend through apertures in the spider arms and are received in apertures 108, and offset blade portion 104 includes at least one aperture 110 for attachment to and positioning the surface processing tool or bearing therefor. Apertures 108 and 110 are desirably threaded to facilitate mounting a surface processing tool or bearing thereto using a threaded bolt or the threaded end of the central shank of a typical rotary bearing 80 (and lock washers and hex nuts, if desired).

Mounting plate 100 is configured for easily attaching above or below spider arm 32, to provide an offset portion 104 to which a surface processing tool is mounted for positioning the rotational or longitudinal axis thereof (depending upon the type of the particular surface processing tool) circumferentially behind the trailing side 32b of spider arm 32, and to not interfere with pivot assembly 35 associated with each spider arm 32. One advantage of attaching the mounting adapter of the present invention to the top surface of the spider arm is that it reduces any tendency of a surface finishing tool to destabilize a troweling machine by raising its center of gravity. This sometimes occurs because surface finishing tools are considerably thicker than trowel blades and, therefore, when a spider arm pivots to a trailing edge down position, the thickness of the surface processing tool supporting the troweling machine on the tool's trailing portions raises the troweling machine considerably more than would a trowel blade supporting the machine on its trailing edge. It will be appreciated that the spider assemblies of troweling machines of different manufacturers have different configurations and that the shape of the offset blade portion 104 must be adapted to not interfere with spider assembly components. In the embodiments of FIG. 5A and FIG. 5B the length of offset blade portion 104 is shortened to not interfere with pivot assembly 35 of a spider assembly, e.g. a Wacker Neuson spider assembly, and comprises about ⅔ of the overall length of the offset mounting plate 100. However, for use with troweling machines of other manufacturers, which may have different spider assembly configurations, the offset blade portion 104 might extend the entire length of the handle 102 or might be otherwise configured to accommodate the spider assembly configuration.

Figure 6:
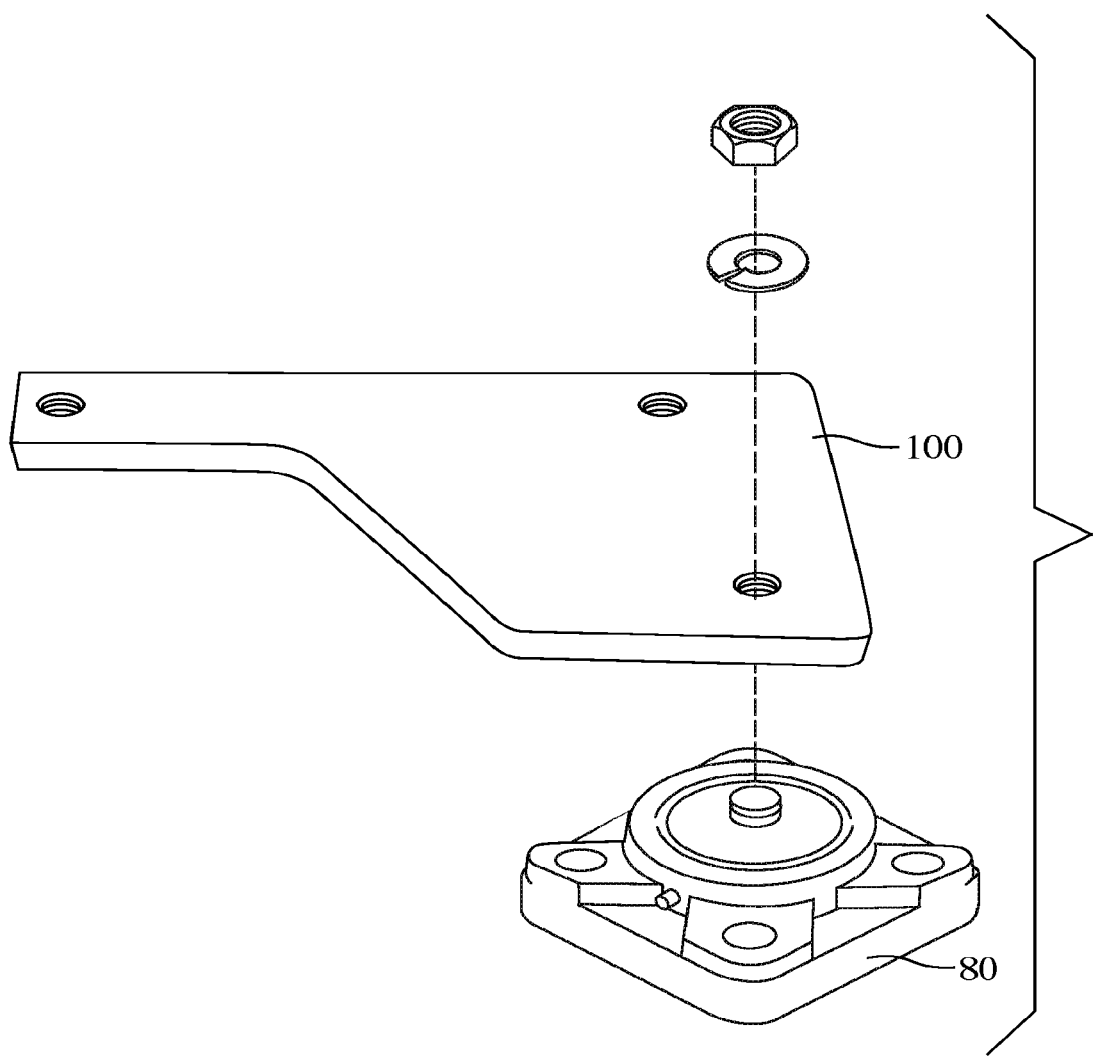
FIG. 6 is an exploded perspective view of one manner in which the offset mounting plate mounts to a bearing, for example, of a rotatable surface processing tool.

FIG. 6 illustrates the manner in which offset mounting plate 100 mounts onto the central shank of a typical rotary bearing 80 of a circular brush using a lock washer and hex nut, or equivalent connectors. When the configuration of FIG. 6 is mounted to a spider arm via apertures 108 in the plate 100, the bearing (and, therefore, the surface processing tool to which the bearing is affixed) is no longer positioned with its rotational axis in vertical registry with and directly beneath the spider arm as is the case with conventional mounting adapters. Rather, it is positioned with its rotational axis circumferentially offset from and behind the trailing side of the spider arm 32.

Figure 7:
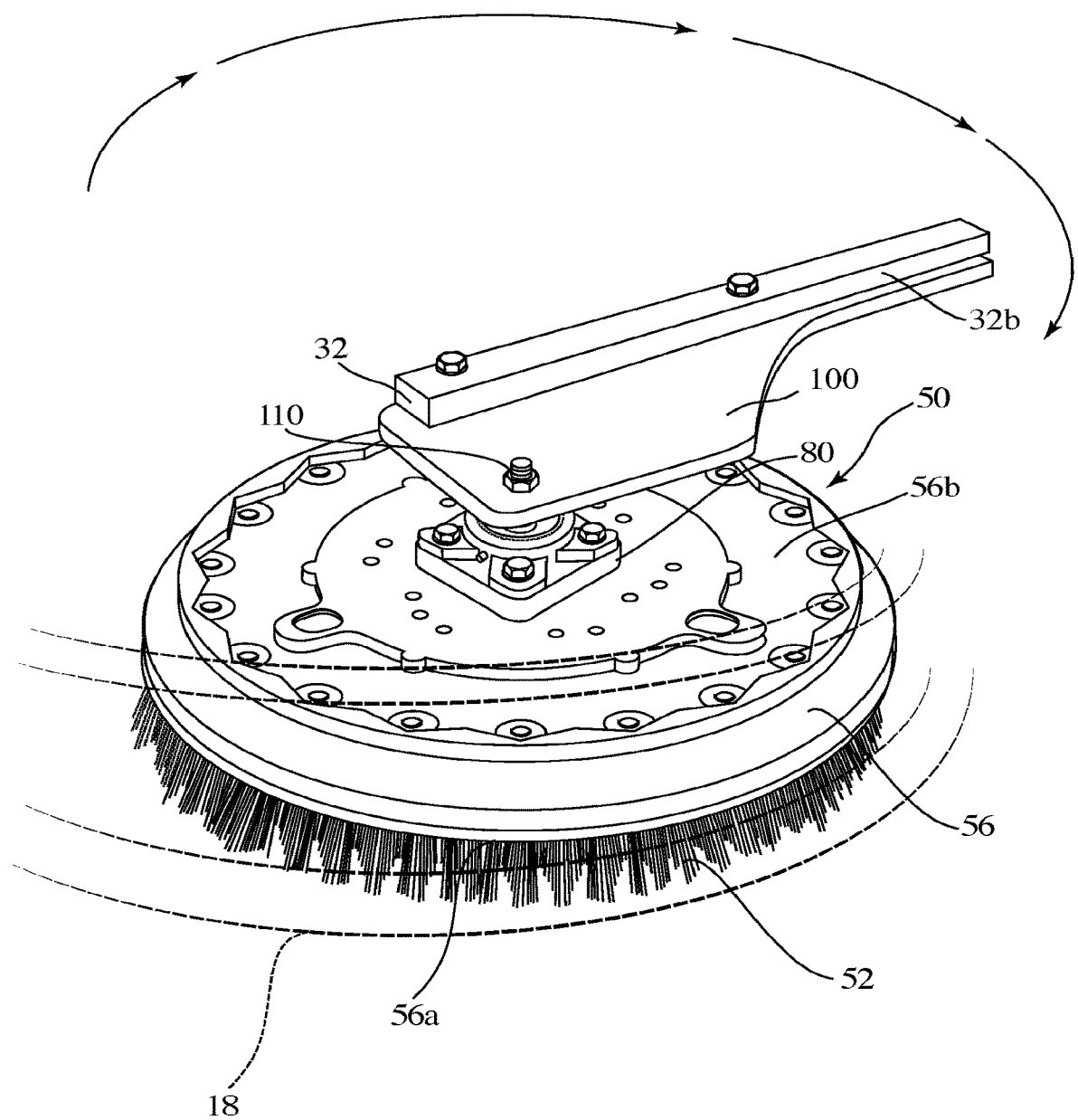
FIG. 7 is a top perspective view of a circular brush assembly mounted below a spider arm using the offset mounting plate of the present invention.
Figure 8:
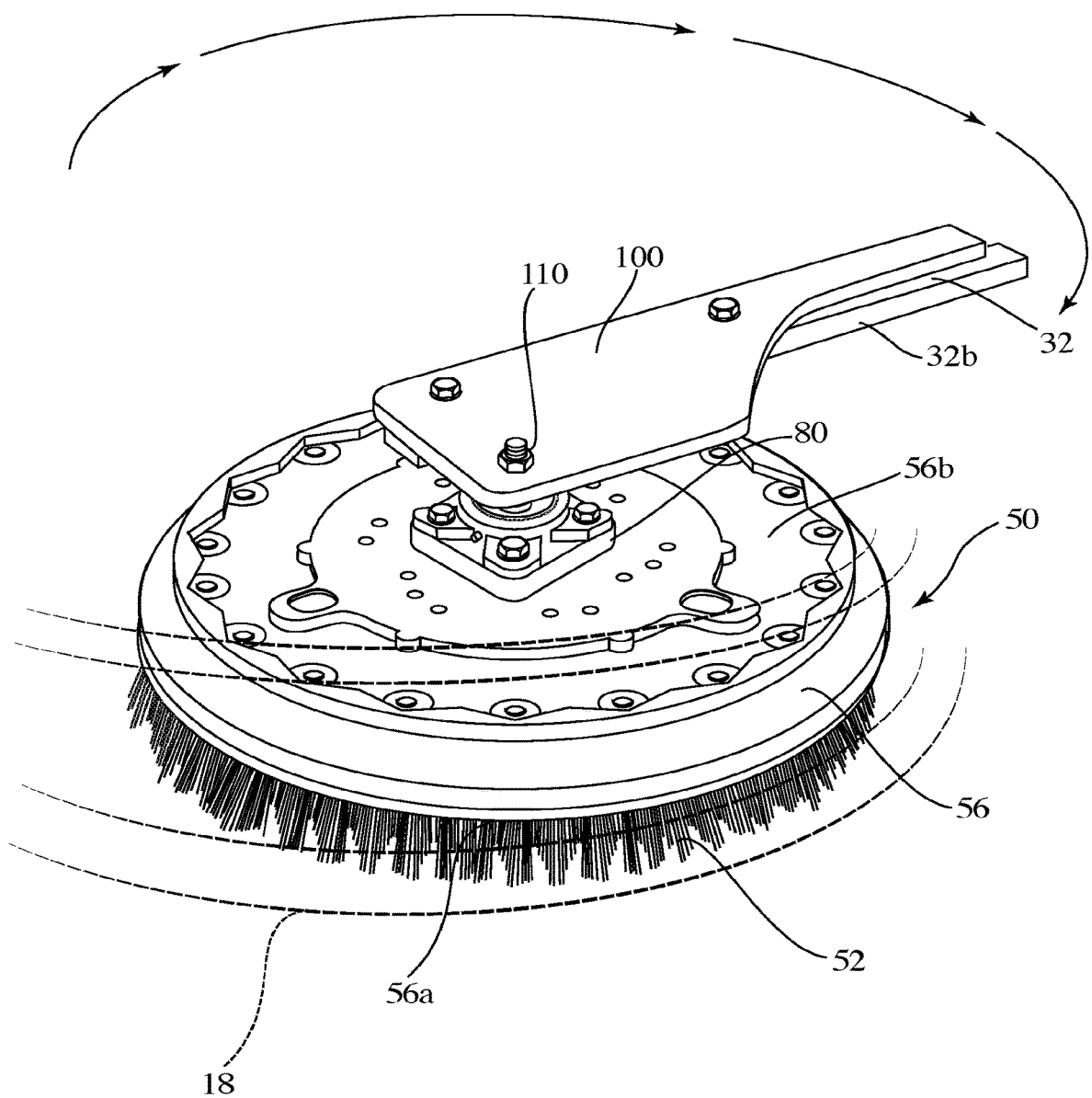
FIG. 8 is a top perspective view of a circular brush assembly mounted above a spider arm using the offset mounting plate of the present invention.
Figure 9:
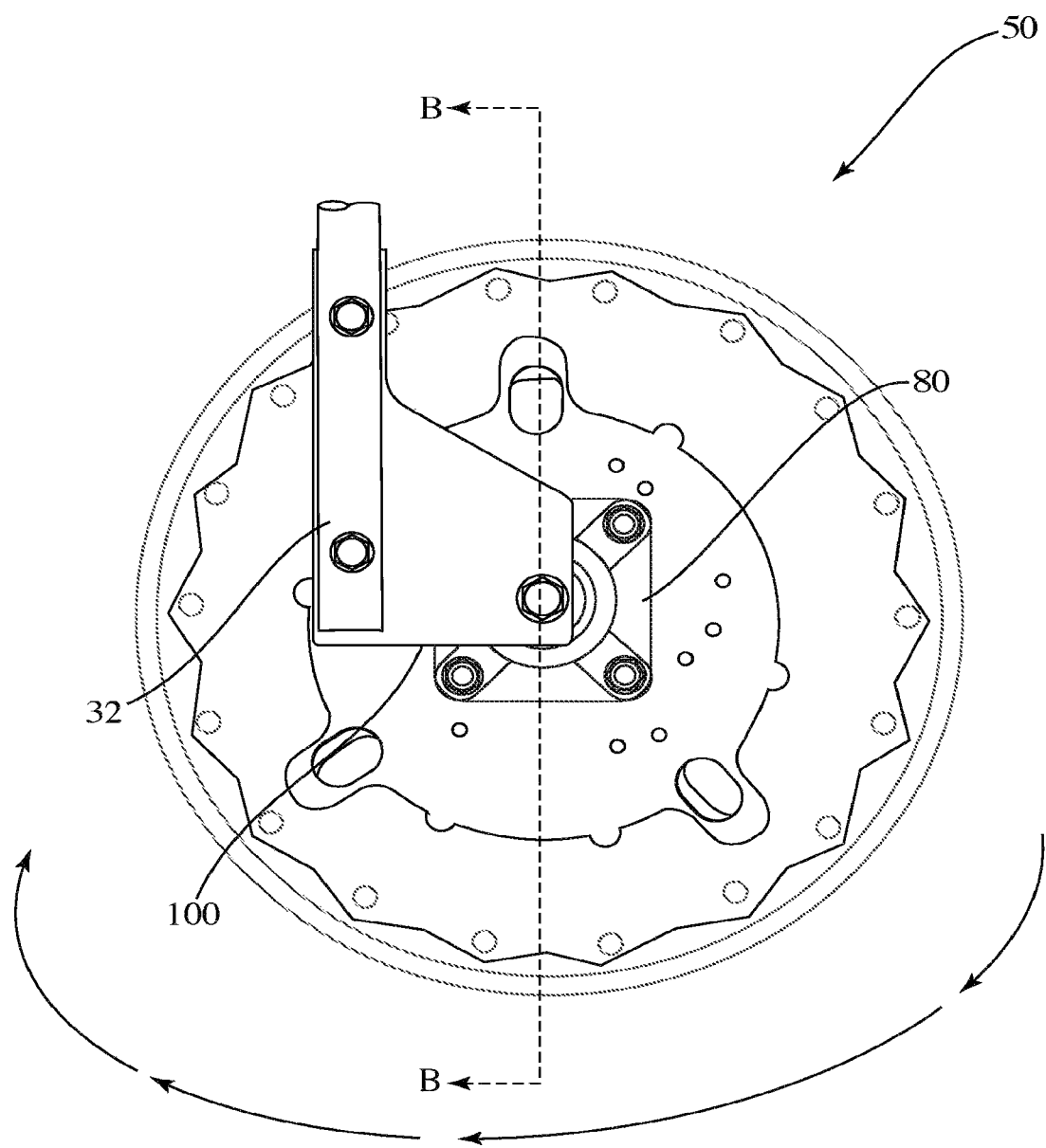
FIG. 9 is a top plan view of the assembly of FIG. 7 when the spider assembly is rotating in a clockwise direction.
Figure 10:
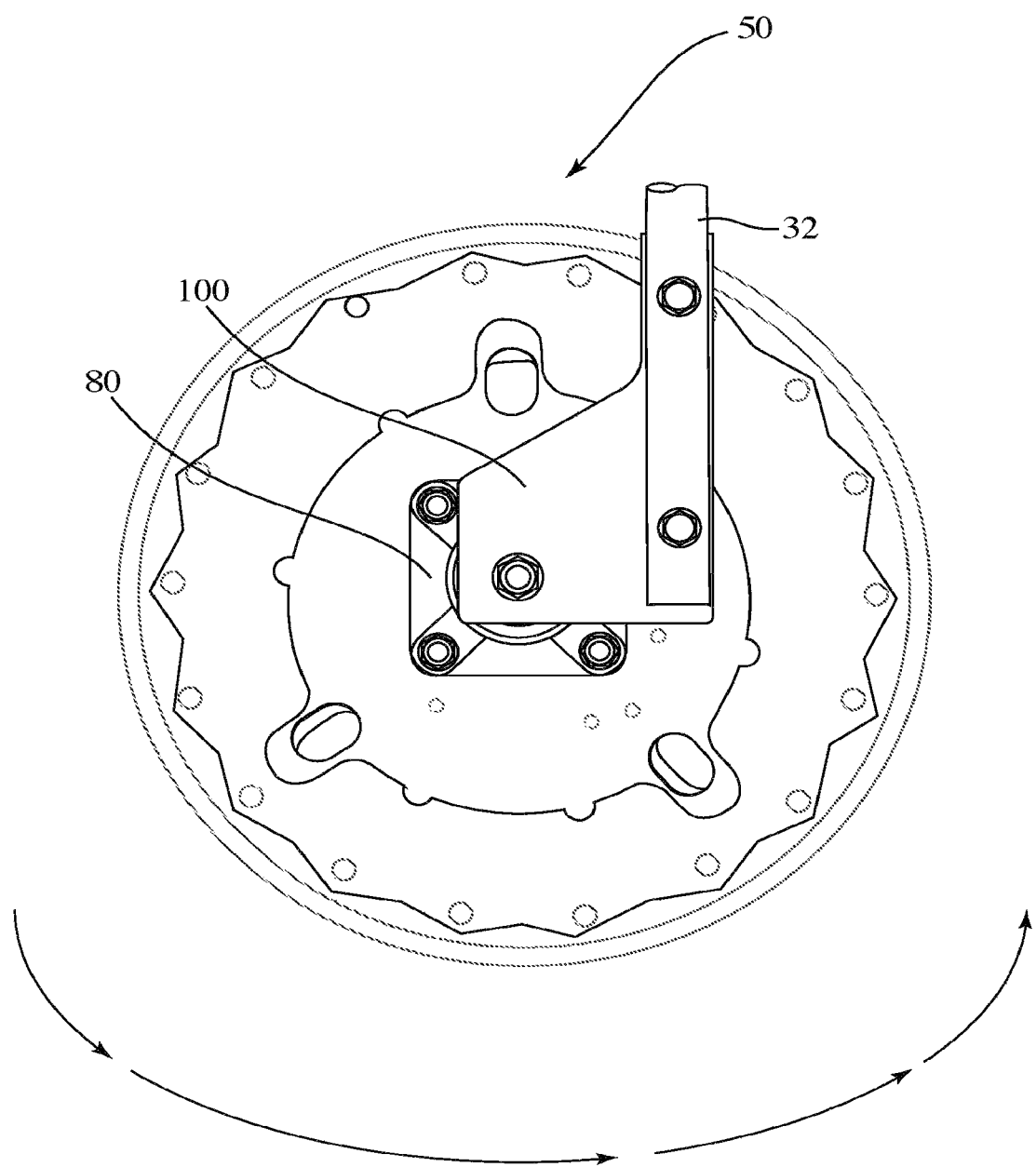
FIG. 10 is a top plan view of the assembly of FIG. 7 when the spider assembly is rotating in a counterclockwise direction.

Referring to FIG. 7 and FIG. 8 there is shown a typical circular brush assembly 50 including a circular bristle brush 52 in the form of a ring having a hollow center (not shown) mounted to or with the bristles extending from the underside 56a of a brush cover plate 56, which has an upper surface 56b which may be flat or slightly convex. Cover plate 56 includes a central aperture (shown as 58 in FIG. 11) for receiving a mounting shank of a typical rotary bearing 80 therethrough. A brush assembly 50 is mounted to one of the arms 32 of a spider assembly 30 by first mounting the brush assembly to aperture 110 of an offset mounting plate 100, which itself is mounted below (FIG. 7) or above (FIG. 8) arm 32 of the spider assembly 30. Brush assembly 50 is thereby mounted with its rotational axis offset to the rear of the trailing side 32b of the spider arm 32, which can be clearly seen in FIG. 9 as spider arm 32 rotates clockwise and in FIG. 10 as spider arm 32 rotates counterclockwise. Brush assembly 50 is mounted to offset mounting plate 100 in a manner which allows brush assembly 50 to lie flat on the concrete surface and to spin freely on its axis, as will be seen from the following description.

Figure 11:
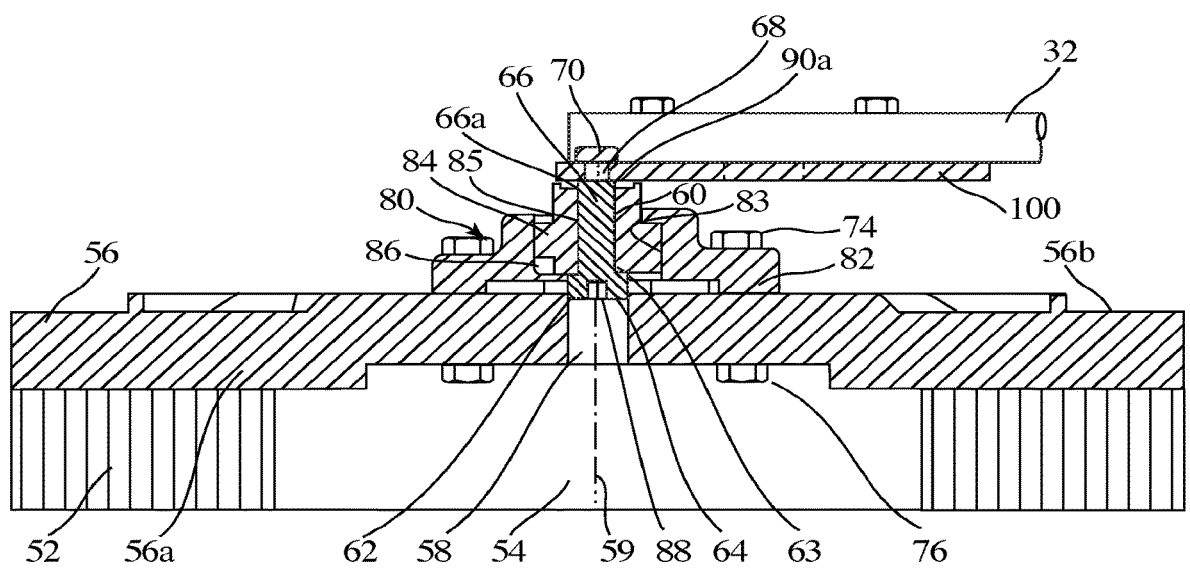
FIG. 11 is a partial sectional view taken along line B-B in FIG. 9.

Referring to FIG. 11, initially a rotary bearing 80 is mounted, e.g., via bolts 74 and nuts 76, on the upper surface 56b of brush cover plate 56 and positioned thereon such that bearing 80 is concentric with the central aperture 58 of the brush assembly 50. Bearing 80 may be any type of bearing, e.g., ball bearing, roller bearing, fluid bearing, magnetic bearing, etc., which will permit each of the brushes 52 on each spider arm 32 to spin freely about its mounting axis perpendicular to the arms. In one illustrative embodiment, bearing 80 includes a stationary hub 82 having a central bore 83, which is mounted to the brush cover plate upper surface 56b, a rotating hub 84 having a central bore 85 mounted within the central bore 83 of stationary hub 82 and fluid bearing means 86 sealed within bearing 80 and between hubs 82, 84 to facilitate concentric rotation of the hubs about a common axis, which is the central axis 59 of the brush assembly central aperture 58. A threaded, radially extending lubrication port (not shown) is desirably formed in stationary hub 82 to facilitate the injection of lubricant, when required. The lubrication port is closed by a grease port through which the lubricant may be injected.

With bearing 80 bolted in place on the upper surface 56b, end 70 of mounting shank 60 is inserted into the central aperture 58 of cover plate 56 from the brush side of cover plate 56 and extends through central bore 85 of rotating hub 84 with threaded portion 68 of shank 60 emerging from the central bore 85. The diameter of shank head 62 approximates the diameter of central aperture 58 but is slightly smaller so that the portion of head 62 which remains within central aperture 58 when shank 60 is fully inserted within rotating hub 82 does not frictionally engage the side walls of central aperture 58 as brush assembly 50 spins on mounting shank 60. Cylindrical shank portion 66 has a smaller diameter than shank head 62 to define an annular shoulder 63 therebetween which seats against the underside of rotating hub 84 when mounting shank 60 is fully inserted therewithin. Cylindrical shank portion 66 has a diameter which allows central aperture 58 of brush assembly 50 to rotate freely about shank head 62 with just enough play to allow bearing 80 to absorb forces encountered during use, such as brush 52 striking bumps on the floor or brush cover plate 56 impacting with walls, and the like. Shank 60 is so dimensioned that, when thus mounted, the smooth portion 66 of mounting shank 60 is rotationally closely adjacent the inner diameter of rotating hub 84 and the brush assembly 50 is securely mounted on offset mounting plate 100, yet is free to spin on the axis provided by mounting shank 60. The threaded portion 68 projecting from rotating hub 84 is threaded or inserted into aperture 110 in offset portion 104 of mounting plate 100 and may be retained using a lock washer and hex nut, or equivalent hardware. In this manner, mounting shank 60 is firmly seated between the underside of rotating hub 84 and offset mounting plate 100. Mounting plate 100 is attached via apertures 108 in handle 102 to spider arm 32 with bolts, as hereinbefore described. A recessed aperture 88, such as a hexagonal aperture, is formed in end 64 of mounting shank 60 to facilitate threading or inserting threaded portion 68 of shank 60 onto offset mounting plate 100.

Mounting the surface processing tool to the offset mounting plate 100 instead of directly to the spider arm 32 or indirectly to the spider arm 32 via one side rather than to the top or bottom of a mounting bar, positions the rotational axis of the tool behind the trailing side 32b of the spider arm 32 instead of in vertical registry with the longitudinal axis L of the spider arm 32 and overcomes the trailing side 32b down tendency of the spider arms 32. This allows the bearing 80 of rotational surface processing tools to operate normally and to freely rotate and causes the surface processing tools to operate while oriented flat on the concrete surface. See FIG. 7. As a result, the surface finishing tools wear uniformly rather than unevenly and undesirable swirls and marks on the concrete surface are avoided.

Figure 12:
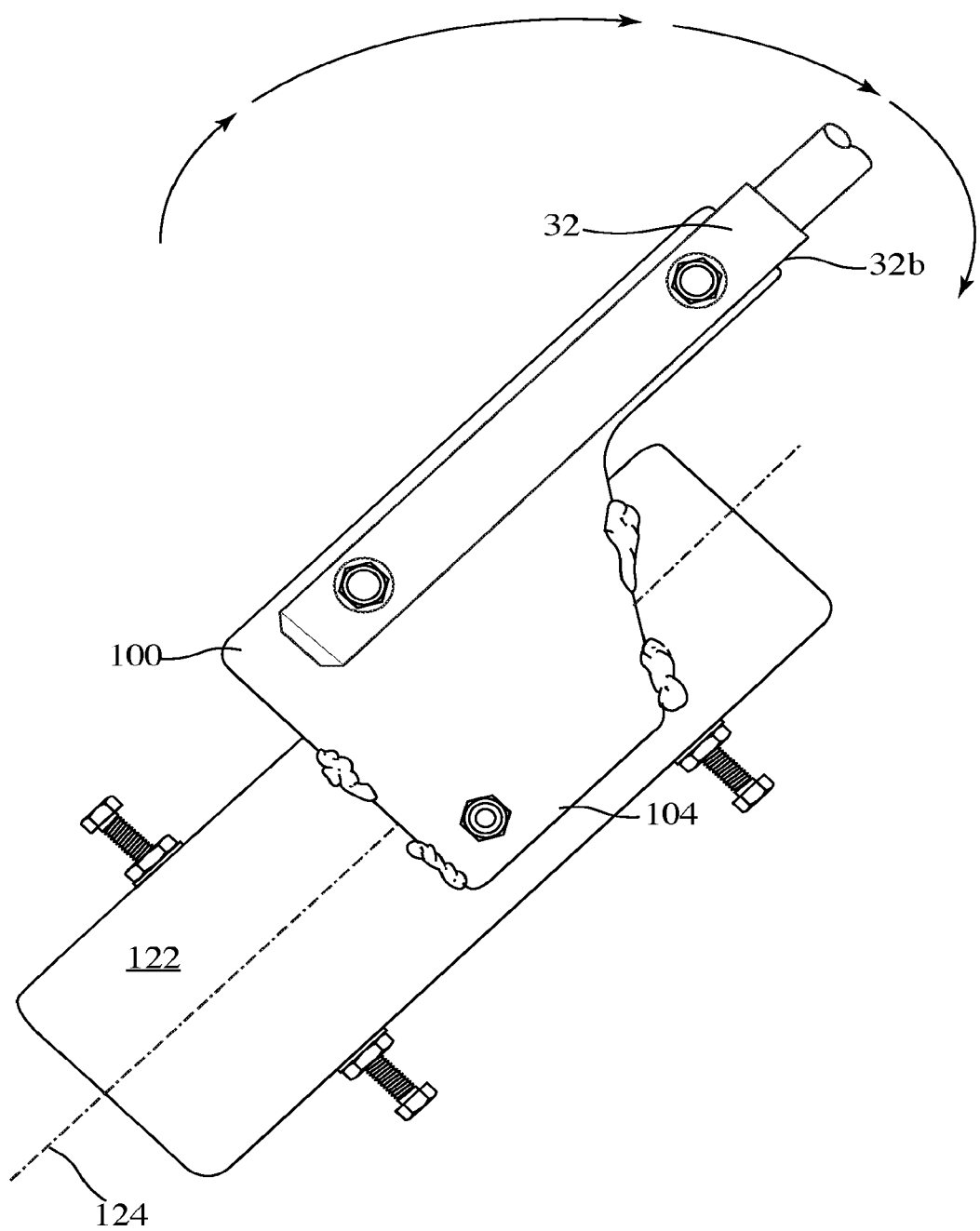
FIG. 12 is a top plan view of a grinding stone holder mounted below a spider arm using the offset mounting plate of the present invention.
Figure 13:
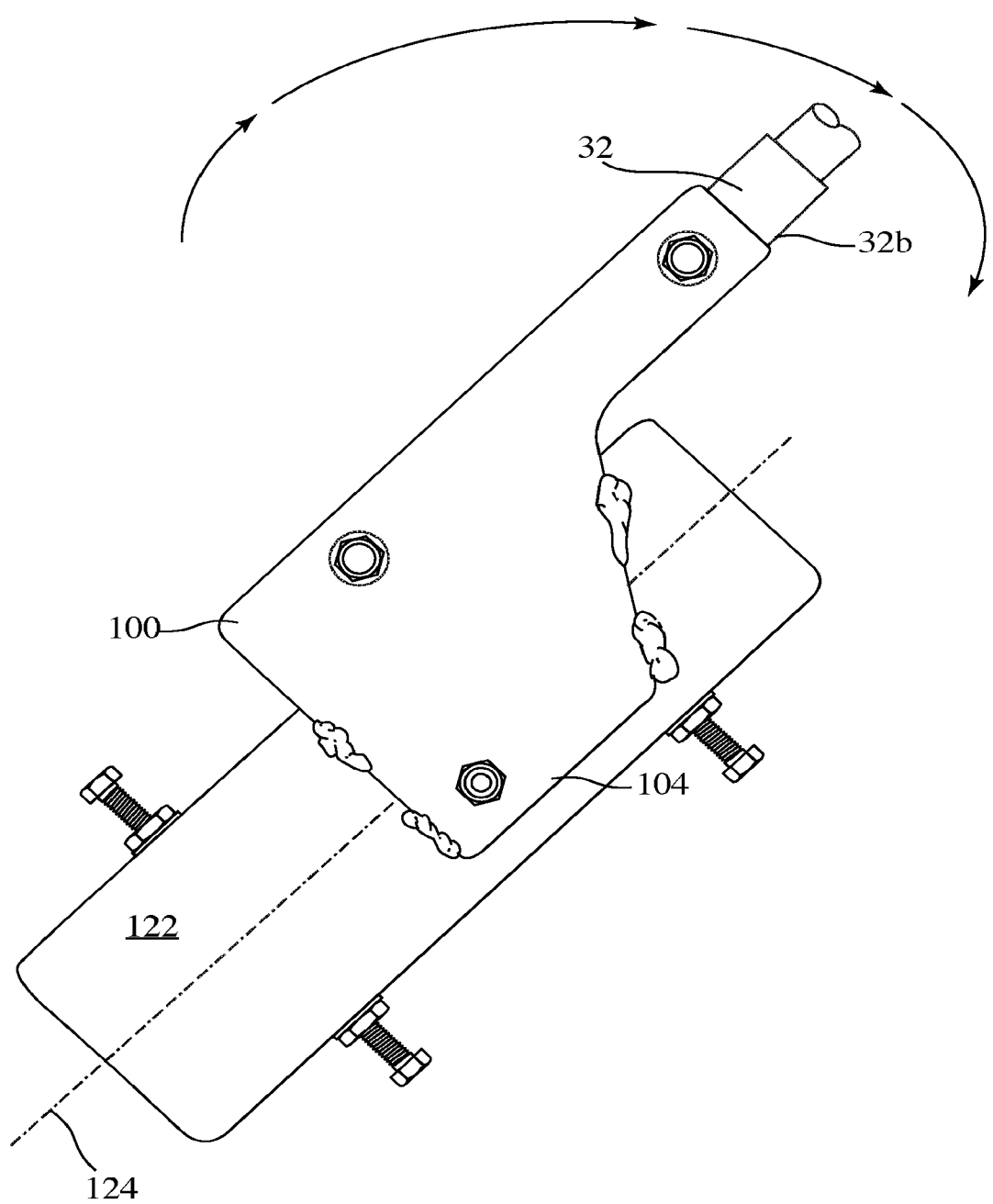
FIG. 13 is a top plan view of a grinding stone holder mounted above a spider arm using the offset mounting plate of the present invention.

A comparable result is achieved with surface finishing tools which do not rotate and, therefore, do not have a rotational axis or require a bearing to be mounted between the tool and the spider arm. Referring to FIG. 12 and FIG. 13, mounting of nonrotating surface-finishing tools, such as grinding stones 120 in grinding stone holders 122, are observed to wear more uniformly and, therefore, to be useful for a longer period of time, if the holder 122 is mounted to the offset portion 104 of offset mounting plate 100 of the present invention and the mounting plate 100 is mounted to the bottom (FIG. 12) or top (FIG. 13) of the spider arm 32, as compared to the longitudinal axis 124 of holder 122 being mounted directly to and in vertical registry with the longitudinal axis L of the spider arm 32. As with the circular brushes hereinbefore described, mounting to the offset mounting plate 100 mounts the longitudinal axis of the surface-finishing tool offset to the circumferential rear of the trailing side 32*b* of the spider arm 32, which can be seen in FIG. 12 and FIG. 13 as spider arm 32 rotates clockwise. In FIG. 12 and FIG. 13, the upper surface of grinding stone holder 122 is welded to the underside of offset blade portion 104. Alternatively, grinding stone holder 122 could be attached to the offset blade portion 104 by providing one or more additional apertures (not shown) in the offset blade portion 104 and attaching the grinding stone holder via bolts extending upwardly through aperture 110 and through the additional apertures from the inside or grinding stone side of the holder 122.

Figure 14:
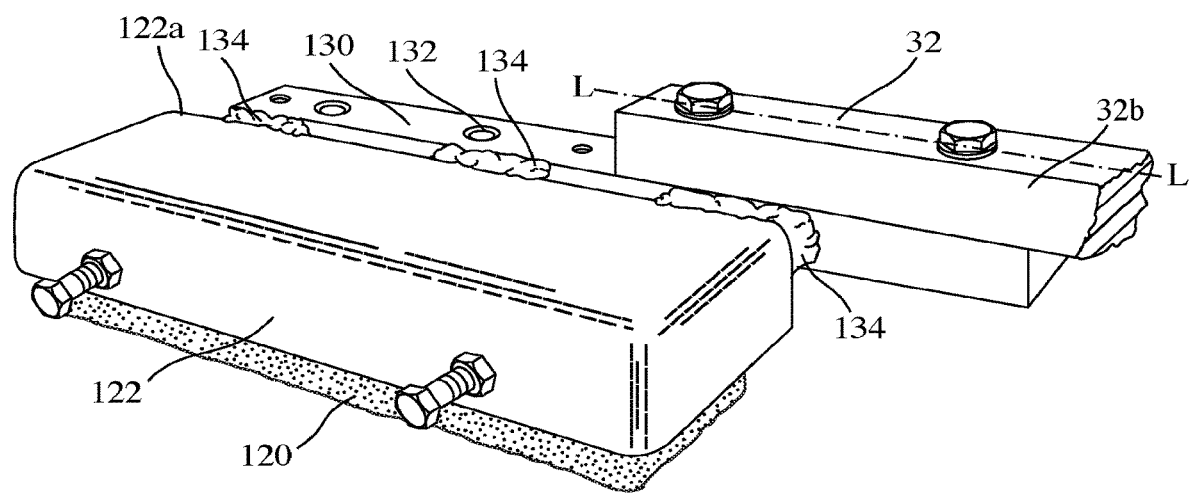
FIG. 14 is a perspective view of a grinding stone holder welded to a mounting bar which is, itself, attached to a spider arm.
Figure 15:
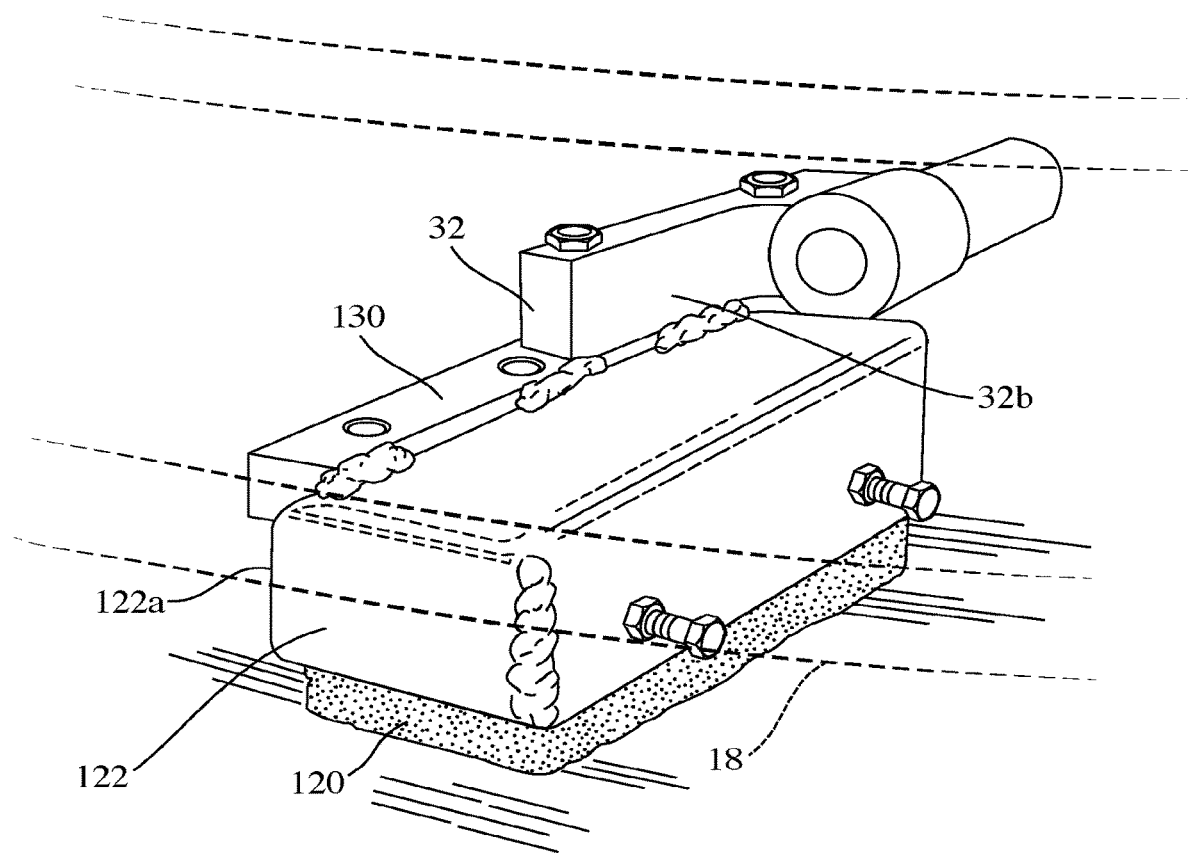
FIG. 15 is a side perspective view of a spider assembly comprising the mounting adapter and surface processing tool of FIG. 14.
Figure 16:
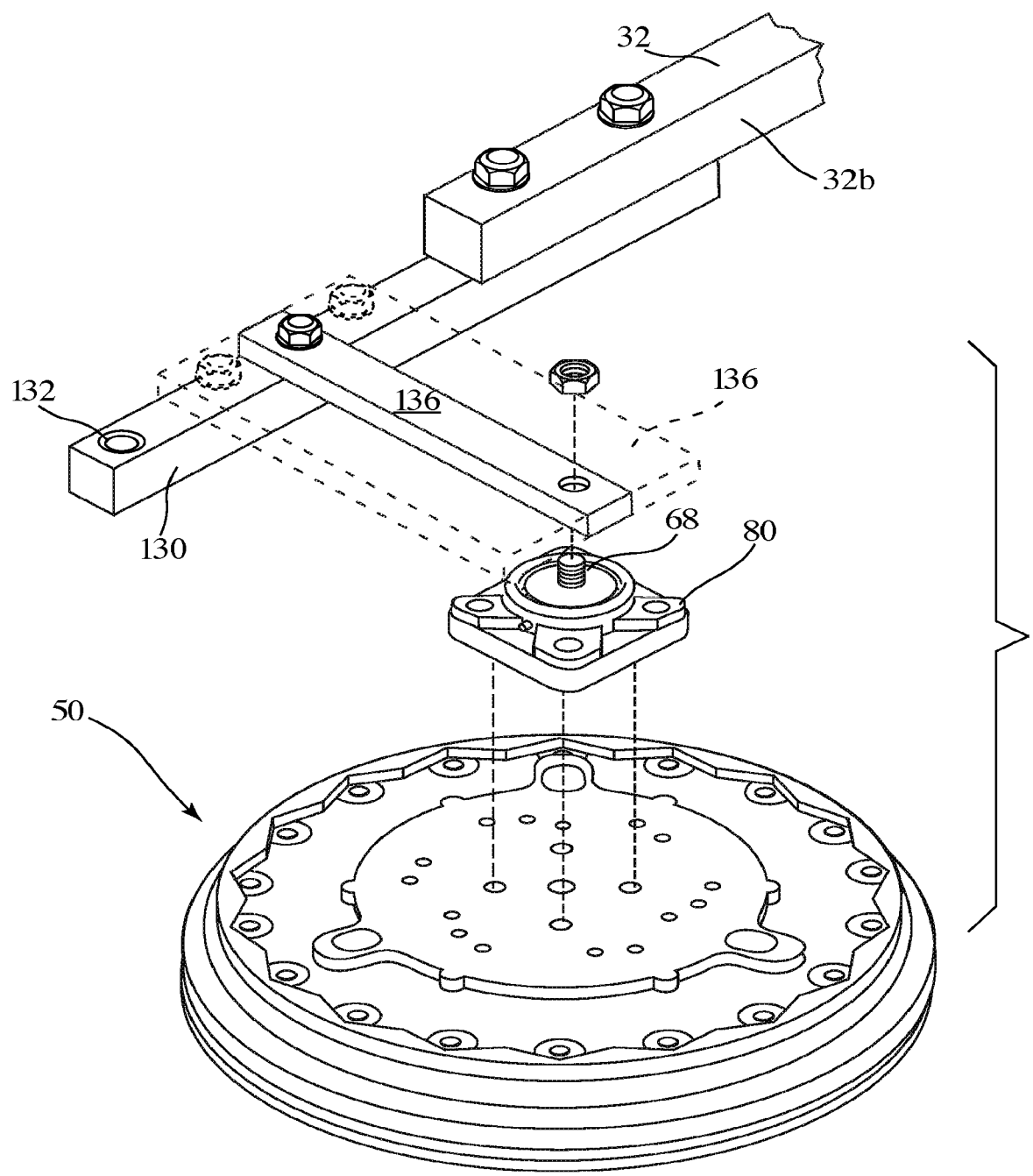
FIG. 16 is a perspective view of a mounting adapter comprising two rigidly attached separate structures for mounting the rotational axis of a circular brush assembly circumferentially behind the trailing side of a spider arm.

As indicated previously herein, the mounting adapter of the present invention comprises a first means for attaching the adapter to the spider arm and a second means for positioning the rotational or longitudinal axis of the surface processing tool circumferentially behind the trailing side of the spider arm. This allows the bearing of rotational surface processing tools to freely rotate and not bind and causes both rotational and non-rotational surface processing tools to operate while oriented flat on the concrete surface, thereby avoiding uneven wear and a shorter useful life. To achieve this goal it has been found advantageous to utilize the offset mounting plate 100 which has been described hereinabove and as illustrated in FIG. 12 and FIG. 13. However, other mounting adapter configurations provide comparable results. For example, referring to FIG. 14, a grinding stone holder 122 may be welded along one of its elongate sides 122*a* to the side of a mounting bar 130 provided with apertures 132 for attaching the grinding stone holder 122 behind the trailing side 32*b* of the spider arm 32 instead of in vertical registry with the longitudinal axis L of the spider arm 32. The mounting bar provides the first means for attaching the mounting adapter to the spider arm 32 and the weld filler material 134 comprises the second means for positioning the longitudinal axis of the holder 122 circumferentially behind the trailing side 32*b* of the spider arm 32. Use of a mounting adapter such as this also allows the surface processing tool to operate while oriented flat on the concrete surface, as can be seen in FIG. 15, thus avoiding uneven wear and a shorter useful life In still another configuration, shown in FIG. 16, a mounting adapter can comprise a mounting bar, such as bar 130 which includes apertures 132 for attaching the mounting bar 130 to a spider arm 32 and, desirably, one or more apertures, such as apertures 132 or others, not shown, for rigidly attaching a surface processing tool positioning means, such as a tool support bar 136 or plate 136 (shown in phantom), to mounting bar 130 via one or more bolts or other rigid securing means. Support bar or plate 136 extends generally perpendicularly from mounting bar 130 in a direction circumferentially behind the trailing side 32*b* of spider arm 32 for mounting the rotatable or longitudinal axis of a surface processing tool, such as the threaded shank 68 of a rotatable bearing 80 attached to a rotatable surface processing tool. See FIG. 16. It will be appreciated that tool support bar or plate 136 may be of any convenient dimensions consistent with the dimensions and operation of the spider assembly and, also, comprehends the use of multiple bars or plates.

While the present invention has been described in terms of specific embodiments thereof, it will be understood that no limitations are intended to the details of construction or design other than as defined in the appended claims.

We claim:

1. A mounting adapter, comprising:
   a member having a first element and a second element;
   wherein:
      the first element is configured to connect to a spider arm of a surface processing machine, the spider arm having a leading side and a trailing side as a function of direction of rotation of the spider arm;
      the second element is configured to connect to a surface processing tool; and
      the second element is offset relative to the first element such that at least a portion of the second element is behind the trailing side of the spider arm when the first element is connected to the spider arm.

2. The mounting adapter of claim 1, wherein the first element is configured to permanently, temporarily, directly, or indirectly connect to the spider arm.

3. The mounting adapter of claim 1, wherein the second element is configured to permanently, temporarily, directly, or indirectly connect to the surface processing tool.

4. The mounting adapter of claim 1, wherein the mounting adapter is configured to connect to a top surface of the spider arm or a bottom surface of the spider arm.

5. The mounting adapter of claim 1, further comprising the spider arm.

6. The mounting adapter of claim 1, further comprising the surface processing tool.

7. A mounting adapter, comprising:
   a member having a first element and a second element;
   wherein:
      the first element is configured to connect to a spider arm of a surface processing machine, the first element connectable to the spider arm at a point along a longitudinal axis of the spider arm;
      the second element is configured to connect to a surface processing tool; and
      the second element is offset relative to the first element at the point along the longitudinal axis of the spider arm where the first element is connectable to the spider arm.

8. The mounting adapter of claim 7, wherein the first element is configured to permanently, temporarily, directly, or indirectly connect to the spider arm.

9. The mounting adapter of claim 7, wherein the second element is configured to permanently, temporarily, directly, or indirectly connect to the surface processing tool.

10. The mounting adapter of claim 7, wherein the mounting adapter is configured to connect to a top surface of the spider arm or a bottom surface of the spider arm.

11. The mounting adapter of claim 7, further comprising the spider arm.

12. The mounting adapter of claim 7, further comprising the surface processing tool.

13. A mounting adapter, comprising:
   a member configured to connect to a spider arm of a surface processing machine and connect to a surface processing tool, the member having a mounting adapter leading side and a mounting adapter trailing side as a function of direction of rotation of mounting adapter;
   wherein:
      the spider arm has a spider arm leading side and a spider arm trailing side as a function of direction of rotation of the spider arm;
      at least a portion of the mounting adapter leading side corresponds with the spider arm leading side;

at least a portion of the mounting adapter trailing side corresponds with the spider arm trailing side;

the member is connectable to the surface processing tool at a portion of the member that is more proximate the mounting adapter trailing side than the mounting adapter leading side.

14. The mounting adapter of claim 13, wherein the member is configured to permanently, temporarily, directly, or indirectly connect to the spider arm.

15. The mounting adapter of claim 13, wherein the member is configured to permanently, temporarily, directly, or indirectly connect to the surface processing tool.

16. The mounting adapter of claim 13, wherein the member is configured to connect to a top surface of the spider arm or a bottom surface of the spider arm.

17. The mounting adapter of claim 13, further comprising the spider arm.

18. The mounting adapter of claim 13, further comprising the surface processing tool.

* * * * *